(12) United States Patent
Lötters et al.

(10) Patent No.: US 6,637,264 B2
(45) Date of Patent: Oct. 28, 2003

(54) MASS FLOWMETER

(75) Inventors: Joost Conrad Lötters, Gaanderen (NL); Hendrik Jan Boer, Assen (NL); Wybren Jouwsma, Lochem (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 09/820,851

(22) Filed: Mar. 30, 2001

(65) Prior Publication Data
US 2001/0027684 A1 Oct. 11, 2001

(30) Foreign Application Priority Data

Mar. 30, 2000 (NL) .............................................. 1014797

(51) Int. Cl.[7] ................................................. G01F 1/68
(52) U.S. Cl. ................................................... 73/204.27
(58) Field of Search ........................... 73/204.16, 204.15, 73/204.13, 204.25, 204.19, 204.27, 204.22

(56) References Cited

U.S. PATENT DOCUMENTS

| | | | | |
|---|---|---|---|---|
| 4,471,655 A | * | 9/1984 | Obayashi et al. | 73/204.27 |
| 4,843,881 A | * | 7/1989 | Hubbard | 73/204.15 |
| 4,909,079 A | * | 3/1990 | Nishimura et al. | 338/25 |
| 4,984,460 A | * | 1/1991 | Isoda | 374/54 |
| 5,461,913 A | * | 10/1995 | Hinkle et al. | 73/204.15 |
| 5,792,952 A | * | 8/1998 | Ritchart | 73/204.27 |
| 6,269,692 B1 | * | 8/2001 | Drexel et al. | 137/486 |

* cited by examiner

Primary Examiner—Edward Lefkowitz
Assistant Examiner—Jewel V. Thompson
(74) Attorney, Agent, or Firm—Young & Thompson (57) ABSTRACT

Mass flowmeter comprising a hollow conduit of a heat-conducting material for transporting in a determined flow direction a fluid with a mass flow rate to be measured, a first temperature-sensitive resistor element at a first position in thermal contact with this conduit for supplying heat to said fluid, a temperature sensor and measuring and control means connectable to the resistor element and the temperature sensor, wherein the temperature sensor is provided in thermal contact with the conduit at a second position upstream in relation to said first position, and the measuring and control means are adapted to maintain a constant difference in temperature at said first and second positions.

28 Claims, 9 Drawing Sheets

MASS FLOWMETER

BACKGROUND OF THE INVENTION

The invention relates to a mass flowmeter comprising a hollow conduit of a heat-conducting material for transporting in a determined flow direction a fluid with a mass flow rate to be measured, a first temperature-sensitive resistor element at a first position in thermal contact with this conduit for supplying heat to said fluid, a temperature sensor and measuring and control means connectable to the resistor element and the temperature sensor.

DESCRIPTION OF THE RELATED ART

Such a mass flowmeter is known from the U.S. Pat. No. 4,984,460, wherein a first temperature-sensitive resistor element wound round a conduit tube is incorporated in a first bridge circuit, which further comprises two resistor elements which function respectively as temperature sensor for determining the ambient temperature and as setting resistor for setting a temperature of the conduit tube at the position of the first resistor element through heat dissipation in this resistor element. The known mass flowmeter further comprises a second temperature-sensitive resistor element which is wound round the conduit tube and which is incorporated in a second bridge circuit, which likewise further comprises two resistor elements which function respectively as temperature sensor for determining the ambient temperature and as setting resistor for setting a temperature of the conduit tube at the position of the second resistor element through heat dissipation in this resistor element. The bridge circuits are connected to a control unit which arranges that the difference in temperature between the two resistor elements wound round the conduit tube and the ambient temperature is roughly equal to a value set using the setting resistors. The mass flow rate of a fluid flowing through the conduit tube is determined in the known device from the difference in energy supplied to the first and second resistor elements wound round the conduit tube.

Because use has to be made of two bridge circuits for operation of the mass flowmeter known from the U.S. patent, the difference in temperature at the position of the first and second resistor elements wound round the conduit tube does not always equal the value zero, which results in an inherent limitation to the sensitivity of this mass flowmeter. A further drawback of the use of two bridge circuits, in addition to inherent stability problems, ensues from the relatively large number of components required for these circuits, this having a cost-increasing effect.

SUMMARY OF THE INVENTION

It is an object of the invention to provide a mass flowmeter with a simple principle of operation, wherein it is possible in principle to suffice with one bridge circuit.

It is also an object to provide a mass flowmeter with a greater range than the known mass flowmeter.

It is a further object of the invention to provide a mass flowmeter with which the mass flow rate of a fluid can be measured more quickly and accurately than with a prior art mass flowmeter.

The said objectives are also stated in the European Patent Application EP 0467430A. A known, conventional flowmeter is also described herein—see column 1, lines 33–48. Stated as drawbacks of this known flowmeter are—see column 1, lines 49–56-: 'Non-linear relationship between the flow and the sensor-output, showing a small inclination and an inflection point in the range of small flow, wherein the flow rate approaches zero, thereby indicating the decreased sensitivity of the sensor in that range'. In column 2, line 31 up to and including column 4, line 5 and referring to the drawings 1–3 accompanying that patent application, there is explained in detail what a conventional thermal-type flowmeter looks like, and in column 4, line 31 and further, referring to FIGS. 4, 5 and 6, there is explained how a thermal-type flowmeter can be constructed to overcome the said drawbacks and be highly sensitive, even in the range of small flows, and be capable of generating a high sensor output over the full range of flow rates, with no inflection point.

These objectives are achieved, and other advantages gained, with a mass flowmeter of the type stated in the preamble, wherein according to the invention the temperature sensor is provided in thermal contact with the conduit at a second position upstream in relation to said first position, and the measuring and control means are adapted to maintain a constant difference in temperature at said first and second positions.

The invention is based on the surprising insight that the mass flow rate of a fluid flowing through a hollow conduit can be derived in reliable manner from the energy which must be supplied at said second position to maintain the difference in temperature at said first and second positions at a constant value.

In an embodiment of a mass flowmeter according to the invention the temperature sensor is a second heat-sensitive resistor element.

In a favourable embodiment the first and the second heat-sensitive resistor element have the same temperature coefficient and these elements are incorporated in a bridge circuit, wherein the resistance of the second resistor element is greater at a determined temperature than the resistance of the first resistor element. Otherwise than in the prior art device, the output signal of the bridge circuit in this embodiment, which is a measure for the mass flow rate to be measured, is wholly independent of the temperature of a medium flowing through the conduit.

In a preferred embodiment the bridge circuit is a wheatstone bridge, the output of which is connected with a feedback loop to the top of the bridge.

In a subsequent embodiment a mass flowmeter with wheatstone bridge comprises a third temperature-sensitive resistor element identical to the first temperature-sensitive resistor element at a third position downstream in relation to said second position in thermal contact with this conduit for supplying heat to the fluid. By choosing identical first and third resistor elements and heating the temperature thereof to the same constant value above the value measured by the temperature sensor, the output signal of the wheatstone bridge is, other than in the preceding embodiments, equal to zero if the mass flow rate for measuring is zero, so that it is not necessary to correct for an offset signal. If the conduit is moreover configured in this embodiment such that heat dissipated in the first and third resistor elements can disappear via convection, conduction or radiation without influencing the value measured by the temperature sensor, the sign of the output signal of the wheatstone bridge moreover gives information about the flow direction of the fluid through the conduit.

In a following embodiment a mass flowmeter with wheatstone bridge comprises an additional temperature-sensitive resistor element identical to the second temperature-sensitive resistor element at a fourth position downstream in relation to said second and first position in thermal contact with this conduit for measuring the temperature of the fluid. This embodiment provides the advantage that the value of the temperature measured by the first temperature sensor can be replaced by an average of the values measured by the first and second temperature sensor, so that inaccuracies in the measured value of the temperature resulting from temperature gradients on the conduit are to a large extent averaged out. If the conduit is moreover configured in this embodiment such that heat dissipated in the first resistor element can disappear via convection, conduction or radiation without influencing the values measured by the temperature sensors, the sign of the output signal of the wheatstone bridge moreover gives information about the flow direction of the fluid through the conduit.

In a very favourable embodiment a mass flowmeter with wheatstone bridge comprises a third temperature-sensitive resistor element identical to the first temperature-sensitive resistor element at a third position downstream in relation to said second position in thermal contact with this conduit for supplying heat to the fluid, and a fourth temperature-sensitive resistor element identical to the second temperature-sensitive resistor element at a fourth position downstream in relation to said second, first and third position in thermal contact with this conduit for measuring the temperature of the fluid. The advantages of the two latter described embodiments are combined in this embodiment.

It will be apparent that the concepts of "upstream" and "downstream" in respect of the described latter three embodiments have an arbitrary significance and serve only to designate the first, second, third and fourth positions relative to each other.

In order to eliminate or at least reduce to a significant extent errors in a mass flow rate to be measured resulting from self-heating of the second resistor element functioning as temperature sensor, the resistance of the second resistor element is greater at a determined temperature than the resistance of the first resistor element, preferably by at least a factor of 10.

In a favourable embodiment the first and the second heat-sensitive resistor element are platinum resistors.

The heat-conducting material of a hollow conduit in a mass flowmeter according to the invention preferably has a thermal conduction coefficient $\lambda$ with a value at least equal to $10\ W.m^{-1}.K^{-1}$. The adverse effect on the result of the flow rate measurement as a consequence of a possible self-heating of the temperature sensor is further suppressed with such a material, for instance stainless steel.

In a practical embodiment the hollow conduit comprises a tube, the inner diameter of which lies in the range between about 0.1 mm and 5 mm, preferably in the range between about 0.8 mm and 3 mm.

The conduit has a wall thickness for instance in the range between about 0.05 mm and about 0.5 mm, preferably in the range between about 0.1 mm and about 0.3 mm.

In an embodiment which is particularly suitable for a strong reduction of errors in a mass flow rate to be measured as a consequence of self-heating of the second resistor element functioning as temperature sensor, the conduit has at the location of the second, the fourth respectively the second and the fourth position a greater wall thickness than at the location of the first position. Owing to the greater wall thickness at said positions, i.e. at the position of the first and/or second temperature sensor, a larger contact surface between conduit and temperature sensor is available for discharging the minimal quantity of heat dissipated in the sensor, while the mass of the underlying thicker conduit wall moreover functions as heat discharge.

In an alternative embodiment of a mass flowmeter according to the invention the temperature sensor is a thermo-element, preferably a thermopile, a first side of which is thermally coupled to said first position and a second side of which is thermally coupled to said second position.

When a thermo-element is applied as temperature sensor, the measuring and control means comprise, by way of example, a per se known processor.

It is noted that the temperature sensor is not limited to the above stated embodiments; this sensor can in principle comprise any temperature-sensitive element suitable for the purpose, such as a wire resistor, a thin-film resistor, a vapour-deposited or a sputtered layer, a thermistor or a pn-semiconductor transition.

A mass flowmeter as described above and also as described in the above-mentioned European patent application EP 467430 A has in turn a number of drawbacks.

Firstly: in order to make the output signal insensitive to changes in the medium temperature it is important that the resistors located both upstream and downstream have exactly the same resistance temperature coefficient. This can only be ensured if both resistors are wound from wire "from the same reel" and therefore of the same wire diameter. If in this manner the resistor located upstream has to be ten times larger than the resistor located downstream, the resistance wire located upstream becomes either ten times longer or ten times thicker than the resistance wire located downstream. Both extremes are not acceptable because with the first method the sensor is not compact and with the second method the sensor does not measure the medium temperature properly.

The drawback of this configuration is thus that the output signal of the flowmeter is dependent on the medium temperature.

Secondly: it is the intention that the resistor located upstream detects only the medium temperature. By placing the resistor located downstream—the heater—far enough away from the resistor located upstream—the sensor—, it is possible to prevent heat leaking from the heater reaching the sensor. However, by incorporating both resistors in a wheatstone bridge configuration, the current through the sensor will, because the current through the heater increases as the flow increases, also increase. This latter causes the sensor to be also heated by dissipation of energy and to also begin to function as heater. As the flow increases the sensitivity of the flow sensor will hereby decrease relative to the theoretically expected sensitivity, and the measuring range of the sensor is limited.

The drawback of this configuration is therefore that the sensitivity of the flow sensor depends on the flow, whereby the measuring range is bounded at the upper limits.

Thirdly: a problem related to the foregoing is that the flow sensor responds more slowly to changes in the flow. This is caused by both sensor and heater functioning as heater: both generate heat to the flow. This involves two time constants, so that the flow sensor will only indicate the final value of the flow after a longer period than if only the heater were generating heat to the flow.

The drawback of this configuration is therefore that the response speed of the flow sensor is not optimal. There may even occur a "lag effect" (first a rapid response resulting from the heater, then a slow response to the final value as a result of the sensor).

Further objects of the invention are therefore:

to provide a mass flowmeter with which higher flows can be measured than with existing flowmeters;

to provide a mass flowmeter with an output signal which is independent of the medium temperature;

to enable more accurate measurement in that the meter operates for longer in accordance with theory;

to enable more rapid measurement in that only the heater has to generate heat and the sensor no longer does so, so that a "lag effect" no longer occurs.

The observed drawbacks of a flowmeter as described above can be avoided by taking the following measures in respect of the construction of the flowmeter.

The hollow conduit—the tube—can be thickened at the position of the upstream side resistor—the sensor—, whereby the outer surface of the tube is enlarged. A sensor resistor with a higher value than the downstream side resistor—the heater—can thus be realized in simple manner without it being much longer or thicker than that of the downstream side resistor. It is possible in this manner to satisfy the requirement that R(sensor):R(heater)=10:1 with resistance wire "from the same reel". By combining the flow sensor realized in this manner with the circuit of FIG. 2 a mass flowmeter is constructed, the output voltage of which is independent of the medium temperature (intrinsic temperature compensation).

The temperature-sensitive resistor situated upstream, the sensor, can be replaced in the wheatstone bridge by a fixed-value resistor, whereby the output voltage of the wheatstone bridge depends on the temperatures. When the sensor is removed from the bridge, no self-heating takes place and the sensitivity of the flow sensor to flow remains constant, irrespective of the flow. The accuracy and response speed hereby also increase. By arranging the medium temperature sensor in the circuit after the point at which the output signal of the wheatstone bridge is measured it is still possible to compensate for different temperatures of the medium (extrinsic temperature compensation).

A variant hereof is that wherein the heating element is divided into two—one part which continues to function as heating element and a second part which, as temperature sensor, detects the temperature of the heating element. The two temperature sensors are then incorporated in a (passive) wheatstone bridge which serves only as measuring bridge and in which no self-heating of the sensors takes place. The heating element is heated separately of the wheatstone bridge, a temperature sensor detects the temperature and the wheatstone bridge generates a signal such that the heating element is heated under all conditions to a constant temperature above that of the ambient. The voltage over the heating element remains the output signal, which is intrinsically temperature-compensated, is accurate and gives a rapid response.

Optionally arranged at the first temperature sensor is a further second heating element with which the direction of the flow can be determined.

The measuring range of flowmeters which operate in per se known manner with temperature sensors can be increased, when the hollow conduit has a thickened wall along a part of its length, by arranging the temperature-sensitive sensors on this part of the conduit wall. When both resistors each operate as both heating element and sensor, the heat developed by the heating element will leak away through the tube wall. When flow is running through the tube the upstream side tube wall is cooled and the downstream side tube wall is heated. The maximum measuring range is achieved when the upstream side tube wall is wholly cooled and the downstream side tube wall is wholly heated. A determined tube wall thickness represents a determined sensitivity and a determined range.

Thickening the tube wall decreases the sensitivity (the maximum difference in temperature falls, since more heat leakage is allowed), but the measuring range increases (only at a higher flow does the minimum temperature difference to be detected occur).

Measuring range and sensitivity can be further increased by increasing the length of the heating element as seen in the length direction of the tube.

When the resistance values of sensor and heating element are the same, it is possible to ensure by electronic means via the wheatstone bridge that the sensor resistance still has the desired—for instance about ten times—higher value than that of the heater resistance. The advantage hereof is that both resistors can be manufactured from the same resistance wire.

When the set requirements for a flowmeter as understood in this patent application are:

that the occurrence of a temperature gradient between sensor and heater must be prevented (so as to avoid the effect of such a temperature gradient on the output signal);

that the sensitivity of the meter must be maximized, a preferred embodiment of a flowmeter according to the invention is characterized by:

a construction of the flowmeter (conduit tube, windings, housing) which is as symmetrical as possible;

a heater element which is as long as possible as seen in the length direction of the conduit tube;

a tube wall which is as thin as possible (maximum sensitivity, minimal heat leakage and optimal detection of the medium temperature);

a distance between the heater and the sensor which is greater than a defined minimum value (so as to prevent heating of the sensor by the heater).

In respect of the symmetry requirement, a tube bent into a U-shape is preferably used with symmetrically arranged windings thereon, while the fitting must also be symmetrical.

In respect of the thickness of the tube wall, a ratio of outer diameter and inner diameter of the tube is preferably chosen of $$\frac{D_{outer}}{D_{inner}} \leq 1.25$$

In respect of the distance between heater and sensor, this is preferably $\geq 4$ mm en $\leq 10$ mm.

The invention will now be elucidated hereinbelow on the basis of further embodiments and with reference to the drawings. Corresponding components are designated in the drawings with the same reference numerals.

DESCRIPTION OF THE PREFERRED EMBODIMENTS

Figure 1A:
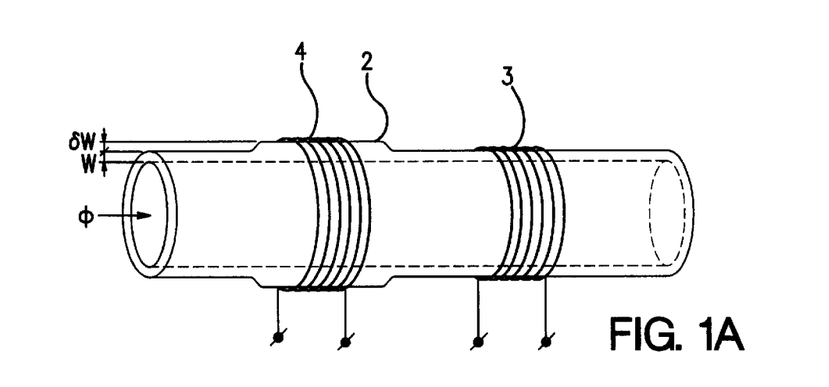
FIG. 1A shows a hollow conduit for a first embodiment of a mass flowmeter according to the invention in perspective view.

FIG. 1A shows a stainless steel (SS) tube 2 with an inner diameter of about 0.8 mm and a wall thickness of about 0.1 mm of a mass flowmeter 1 for a fluid Φ flowing through tube 2 in the direction of the arrow. The capacity of tube 2 is about 2 kg per hour for the calibration liquid isopropylalcohol (IPA) Around the SS tube 2 are wound (electrically insulated) resistance wires and of a nickel-iron alloy commercially obtainable under the brand name Resistherm® and having a resistance of respectively 100 and 1000 ohm, which wires function respectively as heater resistor 3 and temperature sensor 4. By increasing the wall thickness w of tube 2 at the position of the temperature sensor 4 with a valve Δw, the outer surface area of the tube is enlarged at this position. A resistor with a value higher than heater resistor 3 can hereby be realized in simple manner without this resistor being much longer or thicker than heater resistor 3. It is possible in this manner to satisfy the requirement that R(sensor): R(heater)=10:1 with resistance wire "from the same reel". By combining the flow sensor realized in this manner with the circuit of FIG. 2 a mass flowmeter is realized, the output voltage of which is independent of the medium temperature (intrinsic temperature compensation).

Figure 1B:
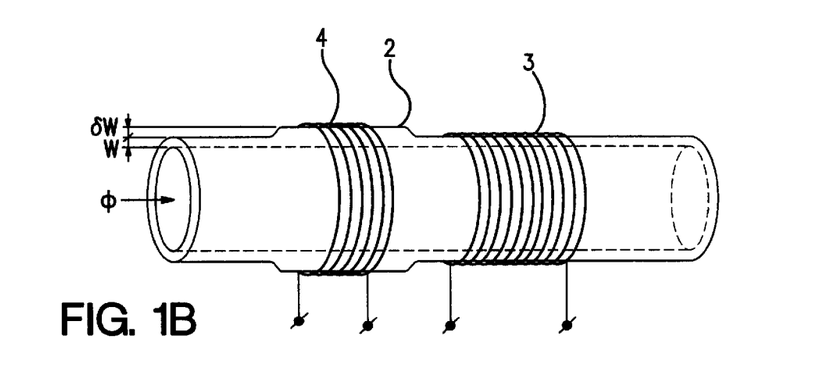
FIG. 1B with a longer heater.

The measuring range and the sensitivity for relatively high flow rates can be increased by increasing the heater length 3 as shown in FIG. 1B.

Figure 1C:
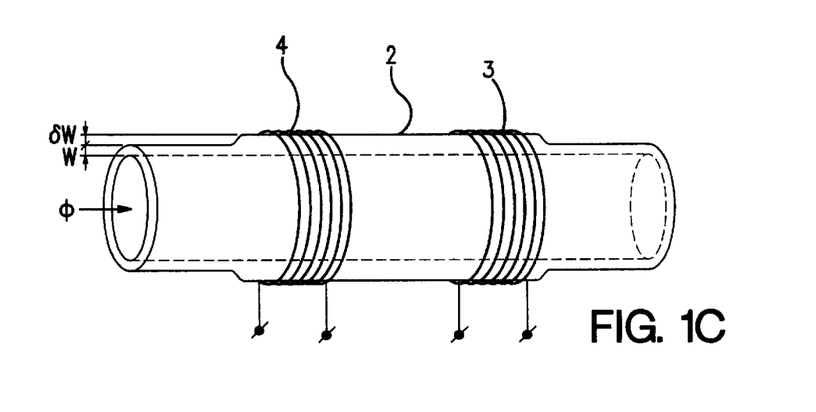
FIG. 1C with heater and sensor both on the thickened part of the hollow conduit, and FIG. 1D a combination of FIG. 1B

By also arranging heater 3 on the thickened part of tube 2 (see FIG. 1C) the measuring range of the mass flowmeter can be increased for relatively low flow rates. The operation is other than in FIGS. 1A and 1B, this as follows: the two resistors 3 and 4 are both heater as well as sensor. The heat developed by the heater leaks away through the tube wall. When there is no flow running through tube 2, a symmetrical temperature distribution occurs along tube 2. When there is a flow running through tube 2, the upstream side tube wall is cooled and the downstream side tube wall is heated. The thus resulting temperature difference is detected by the resistors and is a measure for the flow. The maximum measuring range is achieved when the upstream side tube wall is wholly cooled and the downstream side tube wall is wholly heated. A determined tube wall thickness represents a determined sensitivity and a determined range. The sensitivity decreases by thickening the tube wall; the maximum difference in temperature falls, since the heat leakage can be greater, but the measuring range increases; only at a higher flow does the minimal difference in temperature to be detected occur.

Figure 1D:
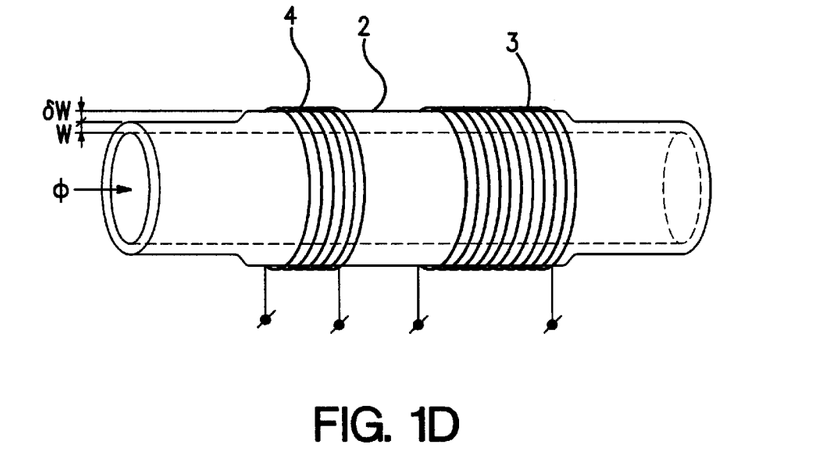

As shown in FIG. 1D, the sensitivity at relatively low flow can be increased even further in the case of an already increased measuring range by increasing the length of resistor 3.

Figure 2A:
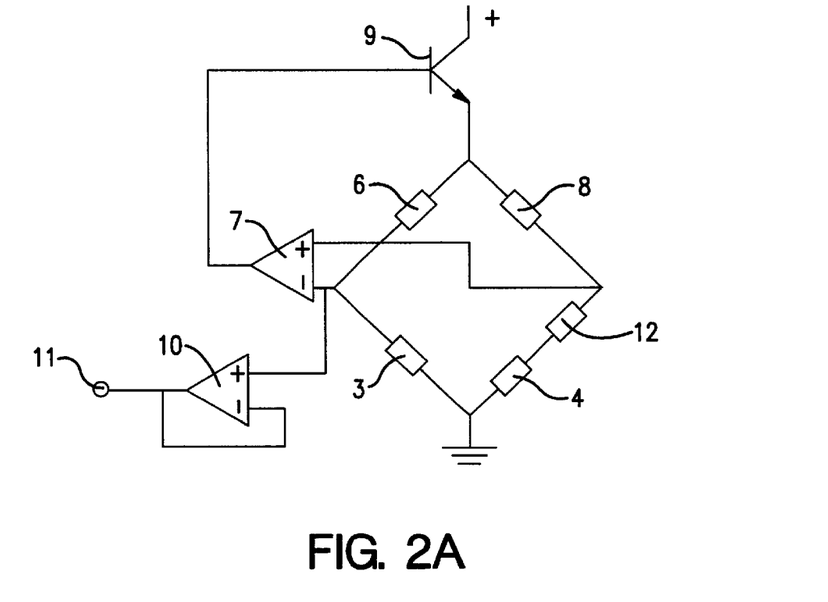
FIG. 2A shows a diagram of a bridge circuit for controlling the sensor(s) of an embodiment of a mass flowmeter according to the invention.

FIG. 2A shows a bridge circuit 5 in which resistors 3, 4 of FIG. 1 in respectively a "heating branch" and a "sensor branch" are incorporated in series with respectively fixed-value resistors 6, 8 which are chosen such that the ratio of the resistance values equals the ratio of the values of resistors 3 and 4 (in this case 10:1). A voltage over the wheatstone bridge 6, 8, 3, 4, 12 is fed back using a differential amplifier 7 to the base of a power transistor 9 which supplies a current to restore the bridge to balance, and to thus hold the difference in temperature of heater resistor 3 and sensor resistor 4 at a constant value determined by a setting resistor 12. The voltage on the junction of the fixed-value resistor 6 and the temperature-sensitive resistor 3 is a measure for the energy dissipated in resistor 3, and thereby for the flow rate of the fluid flowing through tube 2. This voltage is read at the output 11 of an amplifier 10.

Figure 2B:
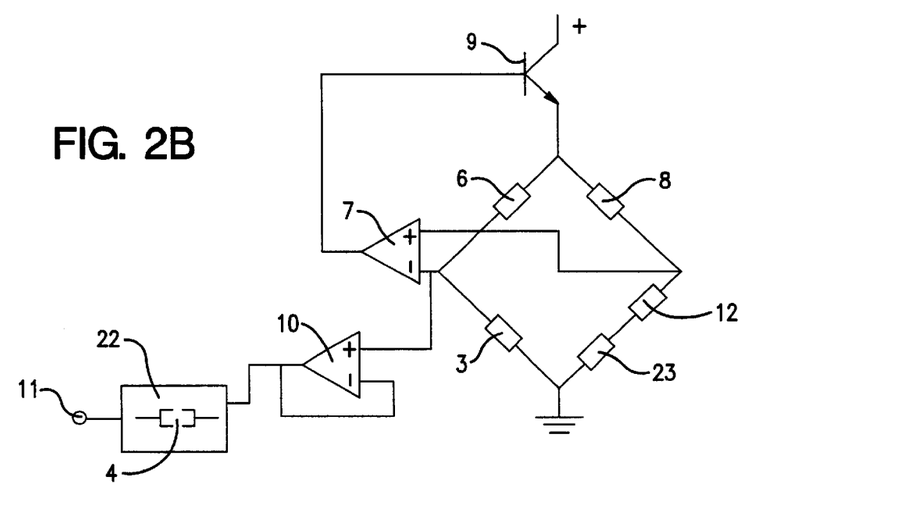
FIG. 2B with a fixed-value resistor instead of a temperature sensor in the bridge and the temperature sensor outside it.

FIG. 2B shows the construction in which the sensor resistor of FIG. 2A is replaced by a fixed-value resistor 23, whereby the output voltage of wheatstone bridge 5 becomes dependent on the temperature. However, because sensor 4 is removed from bridge 5, no self-heating takes place and the sensitivity of the mass flowmeter to flow remains constant, irrespective of the flow. The accuracy and the response speed hereby also increase. By incorporating temperature sensor 4 in the circuit outside the bridge via circuit 22, it is nevertheless possible to compensate for different temperatures of the medium (extrinsic temperature compensation).

Figure 2C:
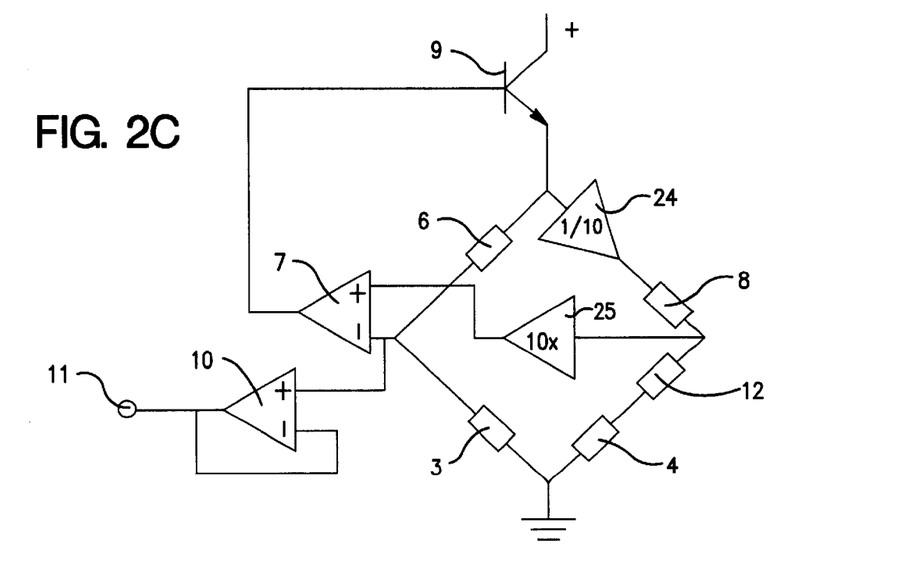
FIG. 2C with a means for increasing electronic resistance in the sensor branch of the bridge.

In the variant according to FIG. 2C the sensor 4 and heater resistor 3 have the same resistance value. The sensor resistance 4 can be artificially increased by for instance ten times by means of a smart electronic ruse in wheatstone bridge 5. This has the advantage that heater 3 and sensor 4 can readily be wound with wire "from the same reel". The electronic ruse works as follows: in wheatstone bridge 5 an attenuator 24 is arranged between the emitter of power transistor 9 and fixed-value bridge resistor 8. In addition, an amplifier 25 is arranged from fixed-value resistor 8 to the positive input of comparator 7. The right-hand branch of wheatstone bridge 5, consisting of the fixed-value bridge resistors 8 and 12 and sensor resistor 4 is comparable in terms of resistance values to the left-hand branch of bridge 5, consisting of fixed-value resistor 6 and heater resistor 3. However, the attenuator 24 attenuates the signal at the top of the wheatstone bridge by for instance ten times, so that on the right-hand branch there is one-tenth of the voltage which is applied to the left-hand branch. In this manner much less energy is dissipated in sensor resistor 4 than in heater resistor 3, despite the fact that both resistors have the same value. In terms of temperature behaviour the left and right-hand branch of bridge 5 remain exactly in step. The voltage levels between the two branches now differ by for instance a factor of 10, whereby they cannot be directly compared by comparator 7. However, by now amplifying the signal again by for instance a factor of 10 via amplifier 25, both branches can once again be connected directly to comparator 7. In this way the output signal 11 is temperature-compensated without sensor 4 and heater resistor 3 having to have a difference of a factor 10 in resistance value.

Figure 3:
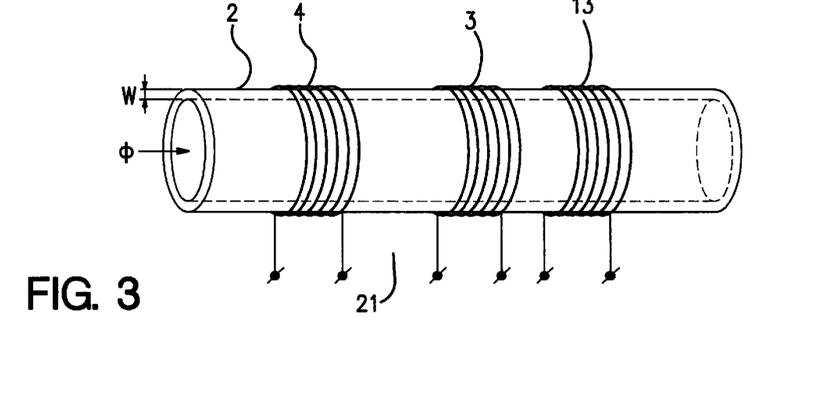
FIG. 3 shows a hollow conduit for a further embodiment of a mass flowmeter according to the invention in perspective view.

FIG. 3 shows a tube 2 of a heat-conducting material with a constant outer diameter along the whole length of a mass flowmeter 21 for a fluid Φ flowing through tube 2 in the direction of the arrow. A third resistance wire 13 functioning as second heater resistor is wound around tube 2 downstream adjacently of resistance wires 4 and 3 functioning respectively as temperature sensor 4 and heater resistor 3.

Figure 4:
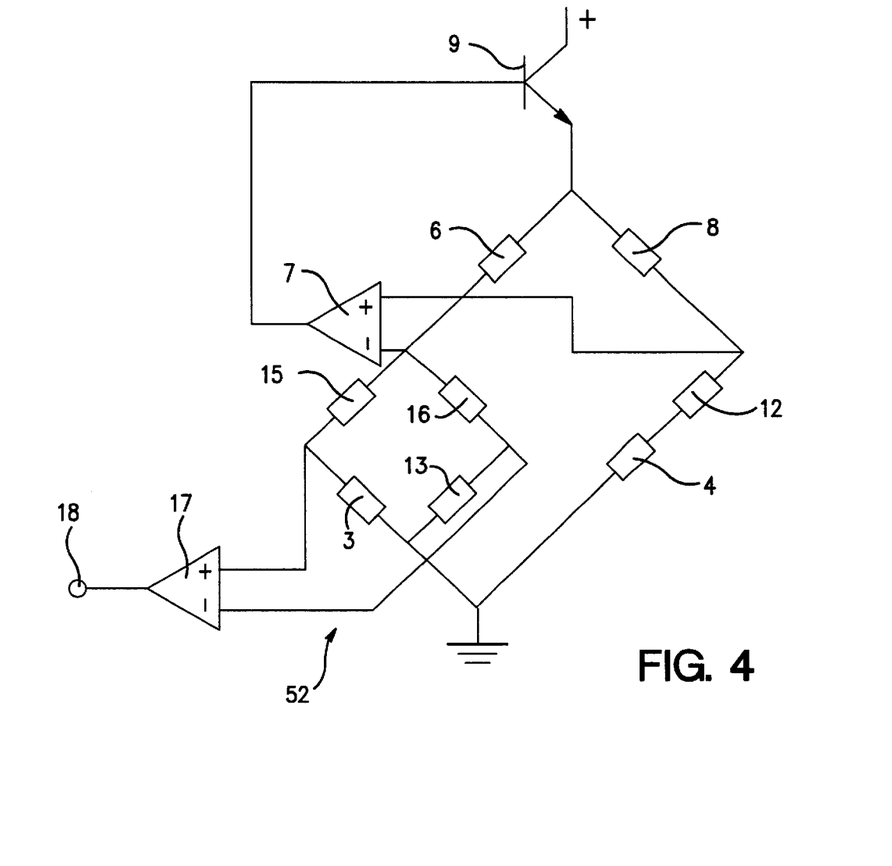
FIG. 4 shows a diagram of a bridge circuit for an embodiment according to FIG. 3 of a mass flowmeter according to the invention.

FIG. 4 shows a first bridge circuit 52 in which resistors 3 and 13 of FIG. 3 are incorporated in a second bridge circuit with fixed-value resistors 15, 16 in a "heating branch" of the first bridge circuit and the resistor 4 is incorporated in a "sensor branch" of the first bridge circuit. A voltage over the first wheatstone bridge 52 is fed back using a differential amplifier 7 to the base of a power transistor 9 which supplies a current to restore the bridge to balance, and to thus hold the difference in temperature of heater resistors 3, 13 and sensor resistor 4 at a constant value determined by a setting resistor 12. The difference voltage over the temperature-sensitive resistors 3, 13 is a measure for the difference between the energy dissipated in resistors 3 and 13, and thereby for the flow rate of the fluid flowing through tube 2, wherein the sign of the measured signal is determined unambiguously by the flow direction of the fluid. This voltage is read at the output 18 of a differential amplifier 17.

Figure 5:
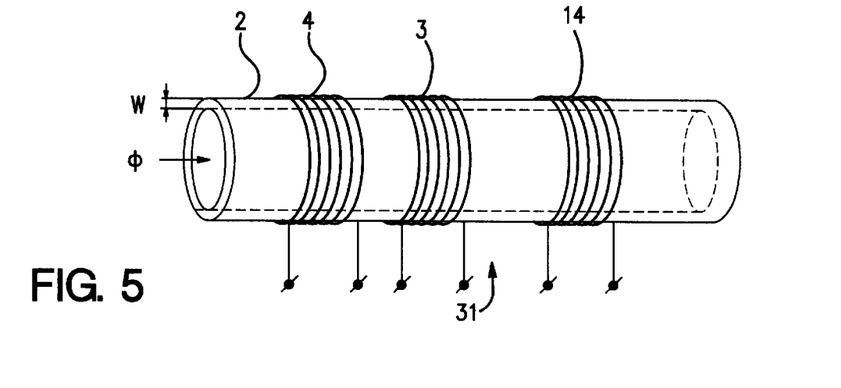
FIG. 5 shows a perspective view of a hollow conduit for yet a further embodiment of a mass flowmeter according to the invention.

FIG. 5 shows a tube 2 of a heat-conducting material of a mass flow-meter 31 for a fluid Φ flowing through tube 2 in the direction of the arrow. An additional resistance wire 14 functioning as second temperature sensor is wound around tube 2 downstream adjacently of resistance wires 4 and 3 functioning respectively as temperature sensor 4 and heater resistor 3.

Figure 6:
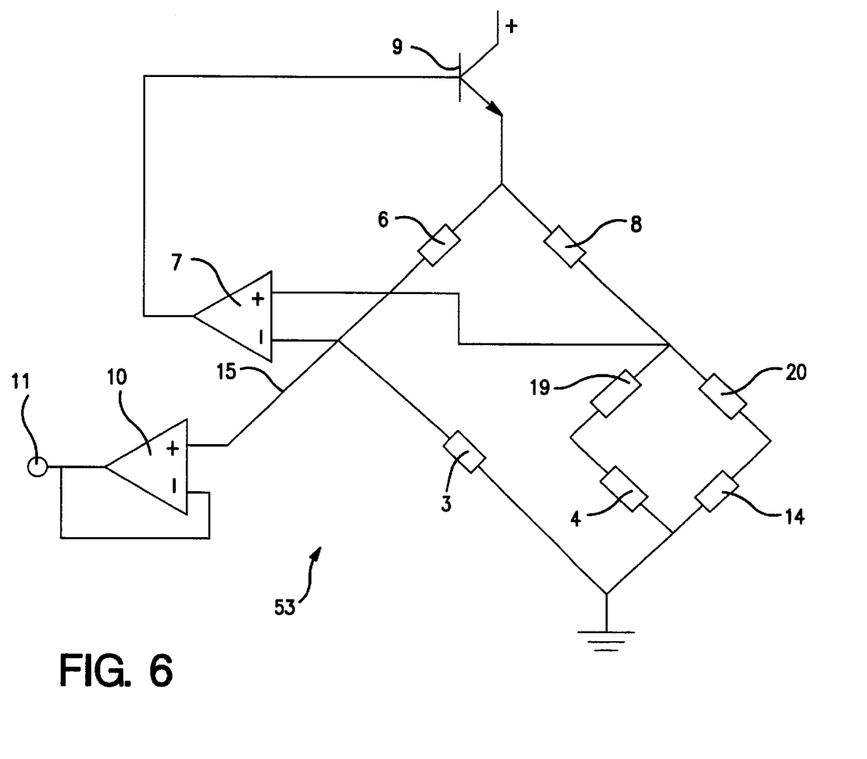
FIG. 6 shows a diagram of a bridge circuit for an embodiment according to FIG. 5 of a mass flowmeter according to the invention.

FIG. 6 shows a first bridge circuit 53 in which resistors 4 and 14 of FIG. 5 are incorporated in a second bridge circuit with fixed-value resistors 19, 20 in a "sensor branch" of the first bridge circuit, and the resistor 3 is incorporated in a "heating branch" of the first bridge circuit. A voltage over the first wheatstone bridge 53 is fed back using a differential amplifier 7 to the base of a power transistor 9 which supplies a current to restore the bridge to balance, and to thus hold the difference in temperature of heater resistor 3 and the average values of the sensor resistors 4, 14 at a constant value. The voltage at the junction of the fixed-value resistor 6 and the temperature-sensitive resistor 3 is a measure for the energy dissipated in resistor 3, and thereby for the flow rate of the fluid flowing through tube 2. This voltage is read at the output 11 of an amplifier 10.

Figure 7:
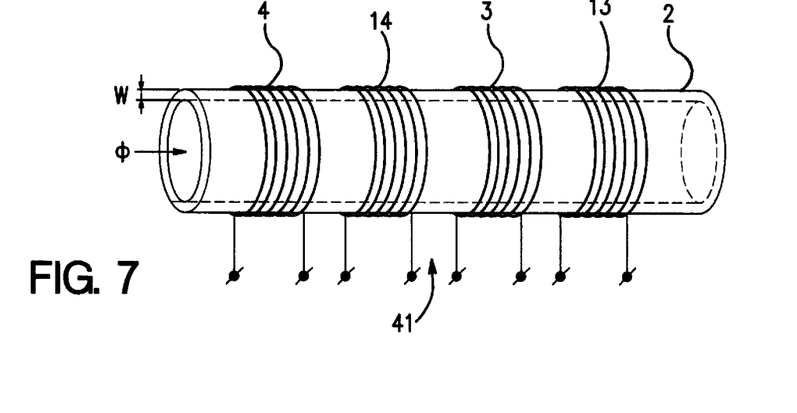
FIG. 7 is a perspective view of a hollow conduit for yet a further embodiment of a mass flowmeter according to the invention.

FIG. 7 shows a tube 2 of a heat-conducting material of a mass flow-meter 41 for a fluid Φ flowing through tube 2 in the direction of the arrow. A third resistance wire 13 functioning as second heater resistor and a fourth resistance wire 14 functioning as second temperature sensor are wound respectively around tube 2 downstream adjacently of resistance wires 4 and 3 functioning respectively as temperature sensor 4 and heater resistor 3.

Figure 8:
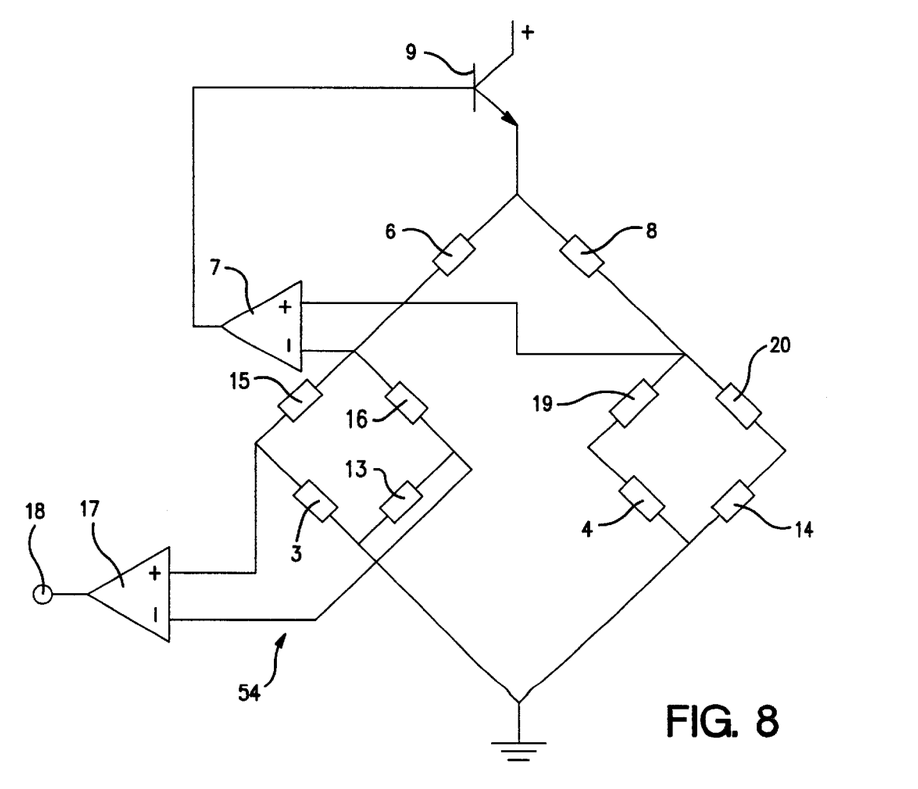
FIG. 8 shows a diagram of a bridge circuit for an embodiment according to FIG. 7 of a mass flowmeter according to the invention, FIGS. 9A and B show two possible variants for dividing the heater into a part in which heating takes place and a part in which the temperature is measured, FIGS. 10A and B show two circuits for controlling the respective meters according to 9A and B.

FIG. 8 shows a first bridge circuit 54 in which resistors 3, 13 and 4, 14 of FIG. 7 are incorporated in respective second bridge circuits corresponding with the second bridge circuits in the first bridge circuits 52, 53 respectively shown in FIGS. 4 and 6, to which reference is made for a further description.

A mass flowmeter according to the invention can be applied in numerous fields, for instance as liquid flowmeter in combination with a regulator valve in a method for producing glass fibres for telecommunication purposes. The sensor measures and controls a liquid flow of a silicon-containing liquid such as methyltrichlorosilane or TEOS. This liquid is brought into vapour phase using an evaporator. In a chemical vapour deposition process (CVD) silicon is bonded with oxygen to form glass. This glass, in rod form, is then drawn into long glass fibres while being heated.

Another application is research and development of fuel cells. The sensor is for instance used in combination with a regulator valve or a pump to supply a fuel, such as methanol or petrol, and water to the cell.

Figure 9A:
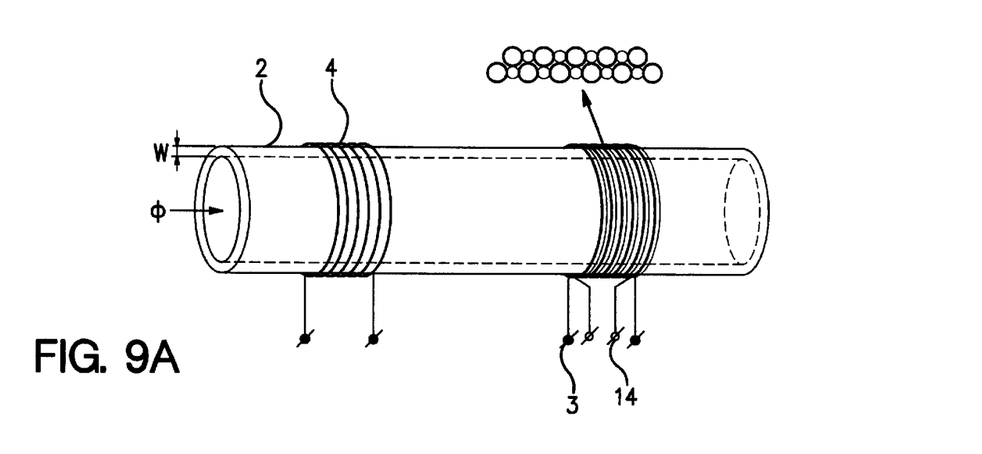

In the construction of FIG. 9A the heater 3 of FIG. 1A is now divided into two parts, each having a different function, i.e. a heater part 3 in which energy is dissipated and a temperature sensor part 14 which detects the temperature of the heater and of the medium. The two separate resistors 3 and 14 are preferably interlaced alternatingly. It is important that both temperature sensor 4 and temperature sensor 14 can be made from resistance wire "from the same reel", so that they have the same resistance temperature coefficients. Their resistance value is preferably also exactly the same. In order to allow the heater 3 to have the largest possible heat-exchanging surface, the resistance wire for heater 3 preferably has a larger diameter than the resistance wire for sensors 4 and 14.

Figure 9B:
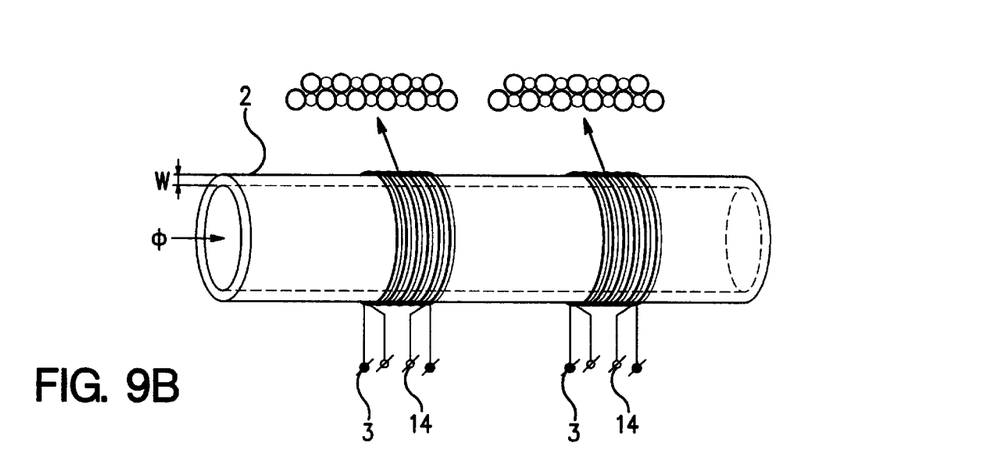

FIG. 9B also shows, when compared to FIG. 9A, an extra heater 13 at the first temperature-sensing element 4. The same applies for this heater/sensor combination as in the case of FIG. 9A. An additional feature of this configuration is that the direction of the flow can also be indicated in this way.

Figure 10A:
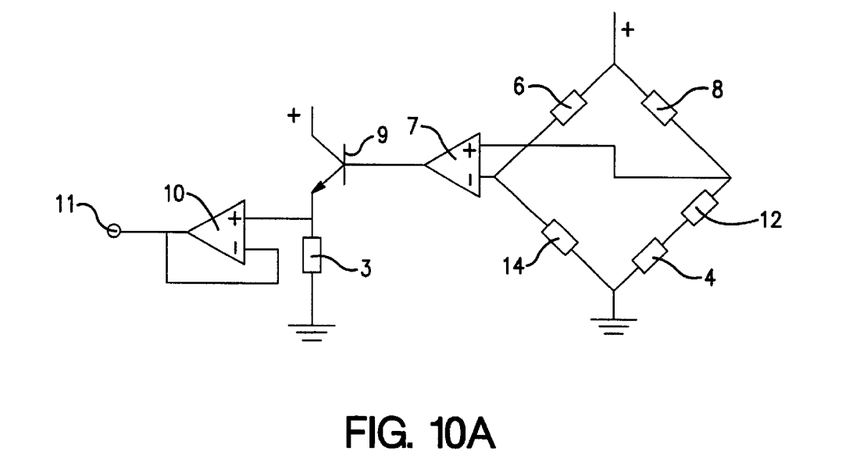

FIG. 10A shows how the two temperature sensors 4 and 14 of FIG. 9A can be incorporated in a passive wheatstone bridge, which functions solely as measuring bridge, and in which no self-heating of the sensors takes place because the bridge is fed by a limited maximum supply voltage. Heater 3 is heated separately of the wheatstone bridge. Temperature sensor 14 detects the medium temperature, the wheatstone bridge generates a signal via comparator 7 such that under all conditions heater 3 is heated to a certain temperature higher than that of the ambient. The temperature difference—ΔT—is adjusted using fixed-value resistor 12; the ΔT is measured using sensor 4. The voltage over heater 3 is still the output signal 11 via buffer amplifier 10. This output signal 11 is intrinsically temperature-compensated, is accurate and has a rapid response.

Figure 10B:
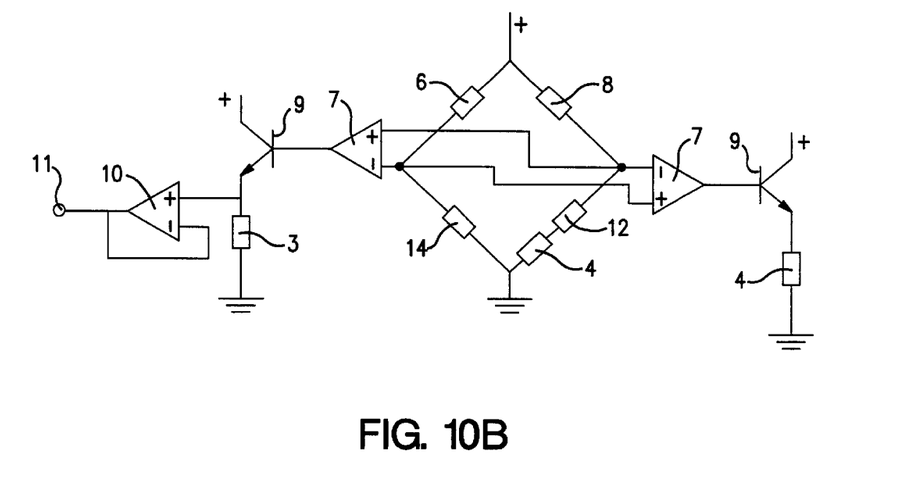
Figure 11A:
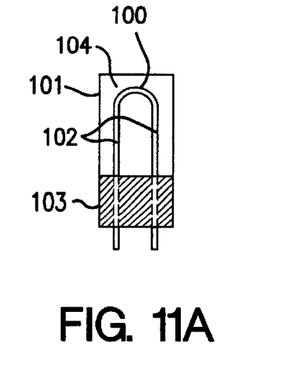
FIG. 11 shows a number of variants relating to the structure of a flowmeter according to the invention which is recommended in view of the requirements in respect of symmetry, length of the heater, thickness of the tube wall and distance between heater and sensor.
Figure 11B:
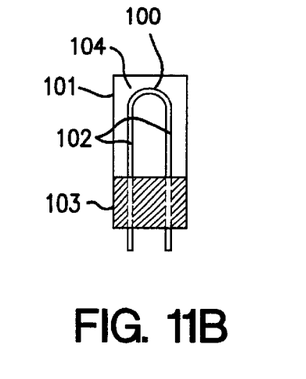
Figure 11C:
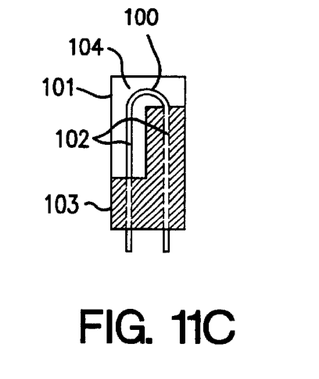
Figure 11D:
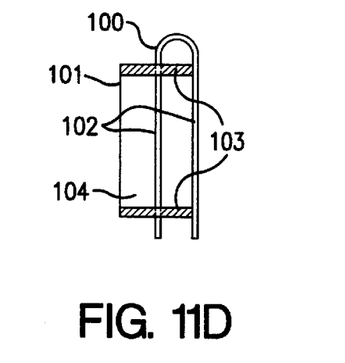
Figure 11E:
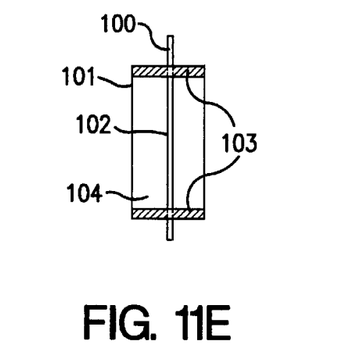
Figure 11F:
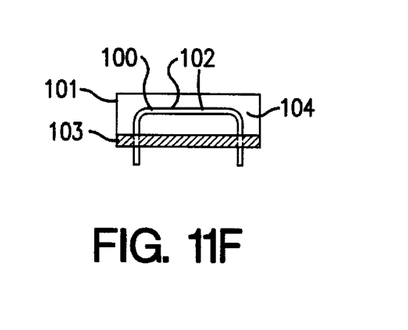
Figure 11G:
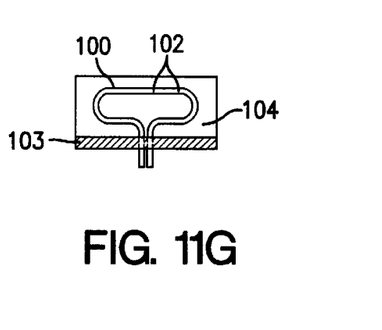

FIG. 10B shows a circuit which is suitable for determining the value of the mass flow as measured by the sensor as shown in FIG. 9B.

FIGS. 11A–11G show seven preferred variants of embodiments of the mass flowmeter. The flow tube 100 can be bent in diverse ways so as to achieve for instance a greater path length in the same straight line. Sensor housing 101 can be designed in diverse ways so as to enable enclosing of the form of the sensor tube. The sensor and heater resistors 102 can be wound in diverse ways, as indicated above in the drawings and descriptions of respectively FIGS. 1, 3, 5, 7 and 9. A heat exchanger 103 can be arranged in various ways so as to equalize differences between ambient and medium temperature. The tube 2 can run in diverse ways inside a heat exchanger 103: straight, bent, spiralled, in order to obtain the greatest possible heat-exchanging surface. Diverse insulation materials 104 can be arranged inside sensor housing 101 to prevent the "chimney effect" resulting from natural convection.

What is claimed is:

1. Mass flowmeter comprising:

a hollow substantially U-shaped conduit of a heat-conducting material having inlet and outlet parts for transporting in a determined flow direction a fluid with a mass flow rate to be measured;

a heat exchanger co-acting with said inlet and outlet parts;

a first temperature-sensitive resistor element at a first position in thermal contact with the conduit for heating the fluid at the first position when power is supplied to the heater; and a temperature sensing means arranged on, and in thermal contact with, the conduit for measuring a difference in temperature between fluid at the first position and fluid at a second position upstream with respect to the first position, the first resistor element being adapted for connection to a control means for controlling the power supplied to the first resistor element so as to maintain the difference in temperature at a constant level, the mass flow being determinable from the power supplied to the first resistor element, and the flow meter having a such thermally symmetrical construction that the occurrence of a temperature gradient between the first and the second position when no power is supplied to the first resistor element is substantially prevented.

2. Mass flowmeter as claimed in claim 1, wherein the means for measuring a difference in temperature comprises the first temperature sensitive resistor element and a temperature sensor arranged in thermal contact with the conduit at the second position.

3. Mass flowmeter as claimed in claim 2, wherein the temperature sensor is a second temperature-sensitive resistor element.

4. Mass flowmeter as claimed in claim 3, wherein the assembly of conduit and wire windings form a thermally symmetrical configuration.

5. Mass flowmeter as claimed in claim 3, wherein the first and second resistor elements have the same resistance value.

6. Mass flowmeter as claimed in claim 3, wherein the first resistor element and the temperature sensing means are symmetrically arranged on the substantially U-shaped conduit.

7. Mass flowmeter as claimed in claim 3, wherein the first and the second temperature sensitive resistor elements comprise wire windings wound around the conduit.

8. Mass flowmeter as claimed in claim 3, wherein the first resistor element and the second temperature-sensitive resistor element have the same temperature coefficient and are incorporated in a single bridge circuit, the resistance of the second resistor element being greater at a predetermined temperature than the resistance of the first resistor element.

9. Mass flowmeter as claimed in claim 8, wherein the bridge circuit is a wheatstone bridge, the output point of which bridge is connected with a feedback loop to the top point of the bridge.

10. Mass flowmeter as claimed in claim 8, wherein the resistance of the second resistor element is at least a factor of 10 greater at a predetermined temperature than the resistance of the first resistor element.

11. Mass flowmeter as claimed in claim 1, wherein the hollow conduit comprises a tube, the inner diameter of which tube lies in the range between about 0.1 mm and 5 mm.

12. Mass flowmeter as claimed in claim 11, wherein the inner diameter lies in the range between about 0.8 mm and 3 mm.

13. Mass flowmeter as claimed in claim 1, wherein the conduit has a wall thickness in the range between about 0.05 mm and about 0.5 mm.

14. Mass flowmeter as claimed in claim 13, wherein the conduit has a wall thickness in the range between about 0.1 mm and about 0.3 mm.

15. Mass flowmeter as claimed in claim 7, wherein the conduit has, at the location of the second position, a greater outer diameter than at the location of the first position.

16. Mass flowmeter as claimed in claim 7, wherein the conduit has a thickened wall at the location of the second position and at the location of the first position.

17. Mass flowmeter as claimed in claim 7, wherein the wall thickness is the same at the locations of the first and the second positions.

18. Mass flowmeter as claimed in claim 1, wherein the means for measuring a temperature difference comprises a thermo-element with a first side thermally coupled to the first position and a second side thermally coupled to the second position.

19. Mass flowmeter as claimed in claim 18, wherein the thermo-element is a thermopile.

20. Mass flowmeter as claimed in claim 9, wherein the sensor resistor is a fixed-value resistor and the sensor resistor is incorporated in a measuring circuit outside the bridge to compensate for different temperatures.

21. Mass flowmeter as claimed in claim 5, wherein the sensor resistor and the heater resistor are incorporated in a single bridge circuit and provisions are present in the wheatstone bridge to virtually increase the value of the sensor resistor by at least a factor of 10 relative to the heater resistor.

22. Mass flowmeter as claimed in claim 21, wherein said provisions comprise an attenuator located between an emitter of a power transistor and a fixed-value resistor, and an amplifier located between another fixed-value resistor and a positive input of a comparator.

23. Mass flowmeter as claimed in claim 2, wherein the heater is divided into a heater part of resistance wire and a sensor part of resistance wire, and the resistance temperature coefficients of said sensor part and of the temperature sensor at the second position are equal.

24. Mass flowmeter as claimed in claim 23, wherein the resistance wires of the heater part and the senso part are interlaced.

25. Mass flowmeter as claimed in claim 23, wherein the resistance values of the sensor part and of the temperature sensor at the second position are equal.

26. Mass flowmeter as claimed in claim 23, wherein a cross-section of the resistance wire of the heater part is greater than a cross-section of the resistance wire of the sensor part.

27. Mass flowmeter as claimed in claim 1, wherein the sensor is divided into a sensor part and a heater part.

28. Mass flowmeter as claimed in claim 23, wherein the temperature sensor and the sensor part are incorporated in a wheatstone bridge fed by a limited maximum supply voltage, and via a comparator of the wheatstone bridge, the heater receives a signal which causes heating of the heater to a temperature set using a fixed-value resistor to predetermined value above ambient temperature, a value of the signal being measured using the sensor.

* * * * *

UNITED STATES PATENT AND TRADEMARK OFFICE
CERTIFICATE OF CORRECTION

PATENT NO. : 6,637,264 B2
DATED : October 28, 2003
INVENTOR(S) : Lotters et al.

It is certified that error appears in the above-identified patent and that said Letters Patent is hereby corrected as shown below:

Replace the sheet of drawing containing Figs. 11A-11G, with the accompanying new sheet.

Signed and Sealed this

Sixth Day of September, 2005

JON W. DUDAS
*Director of the United States Patent and Trademark Office*